United States Patent Office 2,843,539
Patented July 15, 1958

2,843,539

SAMARIUM COMPENSATOR METHOD FOR NUCLEAR REACTOR FUEL

Ira Bornstein, Balboa, Calif., assignor to North American Aviation, Inc.

No Drawing. Application May 16, 1955
Serial No. 508,790

3 Claims. (Cl. 204—154.2)

This invention relates to nuclear reactors, and particularly to a fuel mixture for a nuclear reactor.

If a nuclear reactor is to operate in a steady state, the effective multiplication factor must remain at unity, that is to say, the system must be exactly critical. The multiplication factor, $k$, of a nuclear reactor is defined as the ratio of the number of neutrons of any one generation to the number of the immediately preceding generation. The critical size of a nuclear reactor is defined as the minimum size in which the rate of production of neutrons by the fission process exactly equals the rate of loss of neutrons by escape and by capture. The critical size is not a constant for all reactors but depends on the isotopic composition of the uranium, the proportion of moderator and the presence of various circumstances causing parasitic capture of neutrons.

The neutrons produced by fission in a nuclear reactor are lost or used in one of the following four classes of reactions: First, complete loss of neutrons by escaping from the system; second, nonfission capture as a result of the $(n, \gamma)$ reaction with uranium-238; third, fission capture of slow neutrons by uranium-235 and of fast neutrons by both uranium-238 and uranium-235; and fourth, nonfission capture, often referred to as parasitic capture, by various materials within the neutron flux, including the moderator, structural material, coolant, various extraneous substances such as impurities in the uranium and in the moderator, the control units and fission products. It is the latter nonfission capture of neutrons by the fission products, particularly samarium-149, which is considered below. For ease of identification of the various elements and isotopes of a particular element, the atoms of a particular nuclide or isotope are identified by the element's name followed by the mass number. Thus, "uranium-235" describes the atoms of the uranium element having a mass number of 235, and "samarium-149" describes the atoms of the samarium element having a mass number of 149.

As is well-known, the fission process, in addition to producing neutrons, also produces numerous different fission products. These fission products include the fission fragments produced directly by fission as well as the numerous different decay products of those fission fragments. There is a fixed probability that the fission of a particular fissionable material will form either directly or indirectly any given nuclide. Thus, when uranium-235 is utilized as the fuel of a nuclear reactor, samarium-149 atoms are formed in about 1.4 percent of the fissions. In a nuclear reactor, samarium-149 is formed predominantly as a fission product of the radioactive $\beta$ decay of neodymium-149 and promethium-149 in accordance with the decay equation:

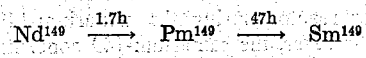

where the half lives for radioactive decay of neodymium-149 and promethium-149 are 1.7 hours and 47 hours, respectively. Since samarium-149 is a stable nuclide, the atoms thus formed are not effectively removed from the reactor's core by radioactive decay with the mere running of time.

Some of the nuclides formed as fission products have comparatively high microscopic absorption cross-sections, $\sigma_a$, for thermal neutrons. The microscopic absorption cross-section for thermal neutrons is a measure of the ability of a particular material to absorb incident thermal neutrons. Specifically, it is the probability of the occurrence of this absorption per atom per incident thermal neutron per square centimeter. The barn is commonly used as the unit of cross-section. Samarium-149 has a cross-section, $\sigma_a$, of about $5.3 \times 10^4$ barns. A cross-section of this magnitude is large enough to cause a serious disturbance of the neutron economy of the reactor. Thus, the samarium-149 in the reactor acts as a poison, removing a certain percentage of the neutrons from the chain reaction thereby necessitating an excess amount of fissionable material to compensate for this loss of neutrons. Upon absorption of a neutron, samarium-149 becomes samarium-150, which in turn has a negligibly low absorption cross-section for thermal neutrons. Since samarium-149 is continuously being formed in the reactor core by the fission process and also is continuously being removed by absorption of neutrons, a condition of equilibrium is eventually reached in any particular reactor in which the rate of formation exactly equals the rate of removal of samarium-149. As is shown below, the equilibrium steady state samarium-149 concentration in a reactor is independent of the neutron flux and is dependent solely on the type and quantity of fissionable material in the reactor.

If $S$ is the concentration of samarium-149 nuclei per cm.$^3$ at any instant, the rate of removal of samarium-149 by neutron capture forming samarium-150 is $\sigma_a \phi S$, where $\sigma_a$ is the microscopic absorption cross-section in cm.$^2$ of samarium-149 for thermal neutron capture and $\phi$ is the thermal flux of the reactor in neutrons per cm.$^2$ per second. The rate of formation of the samarium-149 nuclei depends on the rate of fission in the core. Thus, if $\Sigma_f$ is the macroscopic (thermal neutron) cross-section for fission of the fuel material in the reactor, the rate of fission is equal to $\Sigma_f \phi$ fissions per cm.$^2$ per second. If $\gamma$ is the fractional yield of samarium-149, both as a fission fragment and as a fission product, then the rate of formation of samarium-149 is $\gamma \Sigma_f \phi$ nuclei per cm.$^3$ per second. Therefore, the rate of change of samarium-149 concentration is:

$$\frac{dS}{dt} = \gamma \Sigma_f \phi - \sigma_a \phi S \qquad (1)$$

If the reactor has been operating for some time, the concentration of samarium-149 has attained an equilibrium value and $$\frac{dS}{dt}$$

is zero. Indicating this equilibrium concentration as $S_0$ and the corresponding (steady state) flux by $\phi_0$, Equation 1 reduces to:

$$\sigma \phi_0 S_0 = \gamma \Sigma_f \phi_0$$

and $$S_0 = \frac{\gamma \Sigma_f}{\sigma} \qquad (2)$$

Therefore, the equilibrium concentration, $S_0$, for samarium-149 is independent of the neutron flux in the reactor. However, the time required for a particular reactor to reach equilibrium does depend on the magnitude of the neutron flux, $\phi$, being approximately equal to $5/\sigma_a \phi$ seconds. Thus, it takes about 11 days for the equilibrium condition to exist for a nuclear reactor operating with a flux as high as $10^{14}$ neutrons per cm.$^2$ per second. If the flux is $10^{13}$ neutrons per cm.$^2$ per second, it takes about sixty days to reach the equilibrium condition. Lower values of average flux result in longer periods of time before a state of equilibrium is attained.

In order to compensate for the excess reactivity of the core of a nuclear reactor during the period of time required for the above-mentioned equilibrium concentration of samarium-149 to be attained, past reactors have been designed with an excess amount of control elements to thereby permit initial insertion of a neutron poison in an amount equal, in effect, to the disturbance of the neutron economy subsequently caused by the samarium-149 poison in the core. This compensation for the initial lack of samarium-149 atoms in the core of the reactor was accomplished by an initial deeper insertion of the control elements of the reactor with a corresponding gradual withdrawal of the control element to compensate for subsequent samarium-149 build-up. It is to be noted, however, that an initial amount of excess reactivity equal to about 1% must be built into the reactor core to compensate for the steady state samarium poisoning. This additional amount of excess reactivity is a possible source of danger in the operation of the nuclear reactor, particularly during the samarium build-up time. Thus, if by accident, carelessness or design, the reactor control rod is removed from the vicinity of the core during this samarium build-up time, the reactor is subjected to a much more violent runaway than occurs if the equilibrium condition has been attained. Thus, after the initial starting of the reactor, there is, in addition to the normal amount of excess reactivity built into the reactor for purposes of controlling the power level, an additional 1% excess reactivity built into the reactor for samarium compensation. This latter excess reactivity may well be sufficient to cause a runaway of sufficient magnitude to render the reactor inoperative.

It is therefore an object of this invention to provide a fuel mixture for a nuclear reactor which removes from the control of the reactor operator the excess reactivity required to compensate for steady state fission product poisoning.

It is another object of this invention to provide a fuel mixture for a nuclear reactor in which there is initially inserted in the nuclear fuel the steady state samarium-149 concentration.

It is another object of this invention to provide a method for initially compensating for the steady state samarium poisoning of a nuclear reactor.

It is a further object of this invention to provide a fuel mixture for a nuclear reactor comprising a uniform mixture of about one atom of natural samarium to every 950 atoms of uranium-235 in said fuel.

It is another object of this invention to provide a fuel mixture for a nuclear reactor comprising a mixture of about .068% by weight of $Sm_2O_3$ in $U^{235}O_2$.

Other objects of this invention will become apparent from the following description.

It is to be noted that the over-all safety of operation of a nuclear reactor can be increased by reducing its available excess reactivity. Thus, it is desirable to remove as much as possible of the excess reactivity from the control of the operator and, if possible, from reliance on any mechanical or electrical instrumentation. The samarium compensator of this invention accomplishes this reduction in the available excess reactivity during the time required for samarium built up by initially inserting into the fuel elements of the nuclear reactor an amount of samarium-149 which is substantially equivalent to the amount of steady state samarium poisoning produced by the fission process.

As previously pointed out, the equilibrium steady state samarium concentration in a nuclear reactor is independent of the neutron flux and is dependent only on the quantity of fissionable material in the reactor. It is further noted that the lack of sufficient samarium-149 in the fuel is only present when the reactor is initially placed in operation or when a new fuel element is inserted in the reactor core. The ratio of the number of atoms of samarium-149 to the number of atoms of uranium-235 in the fuel elements of a nuclear reactor when the samarium concentration is in the steady state equilibrium is found by the following formula:

$$\frac{Sm^{149}}{U^{235}} = \gamma \left(\frac{\sigma_f}{\sigma_a}\right) = (.014)\left(\frac{550}{53,000}\right) = \frac{1}{6880} \quad (3)$$

where $\sigma_f$ is the microscopic fission cross-section of uranium-235 ($U^{235}$) for thermal neutrons, $\sigma_a$ is the microscopic absorption cross-section of samarium-149 ($Sm^{149}$) for thermal neutrons, and $\gamma$ is the fractional yield of samarium-149 from fission of uranium-235.

Since natural samarium contains 13.8% samarium-149, the ratio of natural samarium (Sm) to uranium-235, which is equivalent to Equation 3 in its effect on the neutron economy in the fuel, is:

$$\frac{Sm}{U^{235}} = \frac{1}{950} \quad (4)$$

Although metallic samarium has been isolated, samarium oxide ($Sm_2O_3$) is more readily available in very pure form. Most fuel elements presently used in nuclear reactors utilize uranium dioxide ($UO_2$) as a source of uranium. The uranium in this oxide is of varying degrees of enrichment in the uranium-235 nuclide. The ratio by weight of natural samarium oxide to uranium-235 dioxide ($U^{235}O)_2$, which is equivalent to Equation 3 in its effect on the neutron economy in the fuel, is:

$$\frac{Sm_2O_3}{U^{235}O_2} = \frac{.068}{100} \quad (5)$$

Uranium-235 dioxide includes those molecules of uranium dioxide in which the uranium atom is the uranium-235 isotope. Fuel elements containing about .068% by weight of $Sm_2O_3$ very uniformly disbursed in $UO_2$ can be fabricated by standard powder metallurgy procedures well-known to those skilled in the art. Thus, powdered samarium oxide may be physically mixed in powdered uranous oxide in the above-mentioned proportions, mixed with a suitable binder, such as powdered aluminum, and compacted into a fuel element of the desired shape. Such fuel elements are usually further provided with an aluminum cladding to protect the fuel from the coolant.

Therefore, the initial mixture of one atom of samarium-149 to every 6880 atoms of uranium-235, either in the fuel of the nuclear reactor before its initial start-up or in a fuel element which is to be inserted into an operating or temporarily shutdown reactor, effectively eliminates the excess reactivity in the reactor during the samarium build-up time. Either pure natural samarium or a samarium compound may be used to provide the desired ratio of samarium-149 to uranium-235. It is to be noted that the ratios given are optimum values and are not intended by way of limitation. A greater or lesser ratio of samarium-149 to uranium merely goes to the degree of compensation and not to the operativeness of the mixture.

In order to decrease the excess reactivity available in a thermal nuclear reactor the samarium-149 artificially added by mixing natural samarium in the fissionable material in the fuel element should be less than twice the steady state samarium concentration in the reactor. It is to be noted that if the samarium-149 concentration artificially added to the fuel element is a value less than a steady state concentration there is a proportionate amount of excess reactivity available in the nuclear reactor during the samarium-149 build-up time. If, however, the samarium-149 concentration artificially added to the fuel element is more than the steady state concentration there is a proportionate amount of excess reactivity available in the reactor after the samarium-149 build-up time. This latter feature is apparent since the samarium-149 artificially added is eventually converted to samarium-150, leaving only the above-mentioned steady state samarium-149 production and removal. Thus, in the above example in which the optimum ratio of natural samarium to uranium-235 is 1 atom to 950 atoms, there is a reduction in the excess reactivity of some degree if this ratio is any value less than 2 atoms to 950 atoms.

In the above discussion, the uranium-235 isotope of the uranium element is used by way of example. However, other nuclides which are fissionable by thermal neutrons may be utilized as fissionable material in the fuel elements. Thus, the uranium-233 isotope of the uranium element and the plutonium-239 isotope of the plutonium element also fission when subjected to thermal neutrons and further produce as a fission product samarium-149 although in different fractions of yield than that of uranium-235. The ratios of the number of atoms of samarium-149 to the number of atoms of uranium-233 ($U^{233}$) or plutonium-239 ($Pu^{239}$) in the fuel elements of a thermal nuclear reactor when the samarium concentration is in the steady state of equilibrium is found by the following formula:

$$\frac{Sm^{149}}{U^{233}} = \gamma_2 \left(\frac{\sigma_{f2}}{\sigma_a}\right) \qquad (6)$$

and $$\frac{Sm^{149}}{Pu^{239}} = \gamma_3 \left(\frac{\sigma_{f3}}{\sigma_a}\right) \qquad (7)$$

in which the $\gamma_2$ and $\gamma_3$ are the fractions of yield of samarium-149 as a fission product from the fission of uranium-233 and plutonium-239, respectively, and in which $\sigma_{f2}$ and $\sigma_{f3}$ are the microscopic fission (thermal neutron) cross-sections of uranium-233 and plutonium-239, respectively.

Since natural samarium contains only 13.8 percent samarium-149 the ratios of natural samarium (Sm) to uranium-233 and plutonium-239 which are equivalent to Equations 6 and 7, respectively, in their effect on the neutron economy in the fuel, may readily be found by multiplying the ratios of Equations 6 and 7, respectively, by 100/13.8. Therefore, the mass of natural samarium added to the fuel element in order to reduce the excess reactivity of the reactor is less than twice the optimum value given above, that is, the atom ratio of natural samarium to the fissionable material is less than 2(100/13.5) or about 14.5 times the fractional yield, $\gamma$, of samarium-149 from the fission of the fissionable material multiplied by the ratio of the microscopic fission (thermal neutron) cross-section, $\sigma_f$, of the fissionable material to the microscopic thermal neutron absorption cross-section, $\sigma_a$, of samarium-149. This may be expressed by the formula:

$$R < (14.5) \frac{\gamma \sigma_f}{\sigma_a} \qquad (8)$$

Since only 13.8% of the atoms of natural samarium are the samarium-149 nuclide, it is necessary to initially add to the core of the reactor a mass of natural samarium equivalent to about seven times the mass of the steady state samarium-149 component of the reactor. It should be noted that the samarium-149 thus artificially added to the nuclear fuel is gradually lost and replaced by fission product samarium-149 by neutron absorption and conversion to samarium-150 in the manner previously described.

Although this invention has been described and illustrated in detail, it is to be clearly understood that the same is by way of illustration and example only and is not to be taken by way of limitation, the spirit and scope of this invention being limited only by the terms of the appended claims.

I claim:

1. The method of compensating for the excess reactivity provided in a thermal nuclear reactor during the period of samarium-149 build-up comprising initially distributing in a predetermined pattern a mass of natural samarium to provide in the core of said reactor a mass of samarium-149 substantially equal to the mass of steady state samarium-149 in said reactor.

2. The method of compensating for the excess reactivity provided in a nuclear reactor during the period of samarium-149 build-up comprising initially distributing in a predetermined pattern a mass of natural samarium in the core of said reactor equivalent to about seven times the mass of the steady state samarium-149 component in said reactor.

3. In a nuclear reactor utilizing uranium-235 dioxide as a fuel, the method of compensating for the excess reactivity provided in said nuclear reactor during the period of samarium-149 build-up comprising initially uniformly distributing samarium oxide in the fuel elements of said reactor in the ratio of about .068% by weight of samarium oxide to uranium-235 dioxide.

References Cited in the file of this patent

UNITED STATES PATENTS 2,708,656    Fermi et al. _____ May 17, 1955

FOREIGN PATENTS 648,293    Great Britain _____ Jan. 3, 1951

OTHER REFERENCES

The Elements of Nuclear Reactor Theory, by Samuel Glasstone and Milton C. Edlund, D. Van Nostrand Co., N. Y., 1953, pp. 329–339.

Introduction to Nuclear Engineering, Richard Stephenson, McGraw-Hill Book Co., N. Y., 1954, pp. 270–274.